US007419272B2

(12) United States Patent
Schenke et al.

(10) Patent No.: US 7,419,272 B2
(45) Date of Patent: Sep. 2, 2008

(54) DAY AND NIGHT FILM

(75) Inventors: Kay-Uwe Schenke, Neuss (DE); Guido Hitschmarin, Neuss (DE); Stefan O. Dietrich, Neuss (DE); Robert Bennett, Berkshire (GB); Paul E. Humpal, Stillwater, MN (US); Keith M. Kotchick, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/297,615

(22) Filed: Dec. 8, 2005

(65) Prior Publication Data

US 2007/0133095 A1    Jun. 14, 2007

(51) Int. Cl.
    *G02B 27/00*    (2006.01)
(52) U.S. Cl. .................... 359/614; 359/601; 359/613
(58) Field of Classification Search ......... 359/350–361, 359/601–614, 896
    See application file for complete search history.

(56) References Cited

U.S. PATENT DOCUMENTS

| 4,567,082 A | * | 1/1986 | Tabata et al. ............... 428/138 |
| 4,772,096 A | * | 9/1988 | Kai et al. .................... 359/601 |
| 4,772,097 A | | 9/1988 | Takeuchi et al. ............ 359/894 |
| 4,892,387 A | | 1/1990 | Takeuchi et al. ............ 359/601 |
| 5,005,949 A | | 4/1991 | Egawa et al. ................ 359/601 |
| 5,142,415 A | | 8/1992 | Koehnle ...................... 359/601 |
| 5,204,160 A | | 4/1993 | Rouser ........................ 428/167 |
| 5,686,979 A | | 11/1997 | Weber et al. ................. 349/96 |
| 5,916,450 A | * | 6/1999 | Muggli et al. .................. 216/4 |
| 6,025,897 A | | 2/2000 | Weber et al. ................. 349/96 |
| 6,124,971 A | | 9/2000 | Ouderkirk et al. ........... 359/487 |
| 6,398,370 B1 | | 6/2002 | Chiu et al. ................... 359/613 |

FOREIGN PATENT DOCUMENTS

JP          11-271755    * 10/1999    ................. 359/614

* cited by examiner

*Primary Examiner*—Thong Nguyen
(74) *Attorney, Agent, or Firm*—Scott A. Bardell

(57) ABSTRACT

An optical element having a front side and a back side operates in an ambient lit mode and a backlit mode. The optical element includes a diffusely reflecting layer facing the front side for reflecting ambient light. A light absorbing layer faces the back side and is positioned to prevent back light from illuminating the diffusely reflecting layer. A plurality of light transmitting regions extend through the light absorbing layer and the diffusely reflecting layer for permitting back light to pass through in a restricted angular range without illuminating the diffusely reflecting layer.

20 Claims, 4 Drawing Sheets

DAY AND NIGHT FILM

BACKGROUND

The present invention relates to optical films and optical displays incorporating the optical films. In particular, the present invention relates to an optical film for reducing glare on reflective surfaces caused by high angle light emitted from backlit displays.

Instruments and control panels in vehicles such as automobiles are viewable during the day when ambient light such as sunlight is reflected from the surface of the instrument or control panel to the viewer's eye. At night, viewing of the instruments and control panels is facilitated by a backlight, which causes light to pass through the instrument or control panel to produce an illuminated version of the image that is viewable during the day. A problem with lighted instruments and control panels is that light is emitted from the instrument panels through a wide range of angles. Some of this light strikes glass surfaces such as the windshield and is reflected back to the driver. While sunlight prevents such reflections from being visible during the day, they are often clearly visible during the night. These reflections can create a dangerous situation by distracting the driver or even obscuring the driver's view.

SUMMARY

In a first aspect, the present invention is an optical element for operation in an ambient lit mode and a backlit mode. A diffusely reflecting layer faces a front side for reflecting ambient light. A light absorbing layer faces a back side and is positioned to prevent back light from illuminating the diffusely reflecting layer. A plurality of light transmitting regions extend through the light absorbing layer and the diffusely reflecting layer for permitting back light to pass through in a restricted angular range without illuminating the diffusely reflecting layer.

In a second aspect, the present invention is an optical element for operation in an ambient lit mode and a backlit mode that includes an array of light transmitting regions for permitting back light to pass from the back side to the front side and emerge from the front side in a restricted angular range. A light reflecting layer is between the channels and faces the front side for reflecting ambient light. A light absorbing layer is between the channels and positioned with respect to the light reflecting layer to prevent back light from reaching the light reflecting layer.

In a third aspect, the present invention is an optical element including a light transmissive film having a plurality of cavities extending into a first surface thereof. A light reflecting material fills a first portion of each cavity and a light absorbing material fills a second portion of each cavity.

In a fourth aspect, the present invention is a method for producing an optical element including forming a light transmissive film having a plurality of cavities extending into a first surface thereof. A first portion of each of the cavities is filled with a light absorbing material. A second portion of each of the cavities is filled with a light reflecting material.

The above summary is not intended to describe each disclosed embodiment or every implementation of the present invention. The figures and the detailed description which follow more particularly exemplify illustrative embodiments.

The above-identified drawing figures set forth several embodiments of the invention. Other embodiments are also contemplated, as noted in the discussion. In all cases, this disclosure presents the invention by way of representation and not limitation. It should be understood that numerous other modifications and embodiments can be devised by those skilled in the art which fall within the scope and spirit of the principals of this invention. The figures may not be drawn to scale. Like reference numbers have been used throughout the figures to denote like parts.

DETAILED DESCRIPTION

Figure 1:
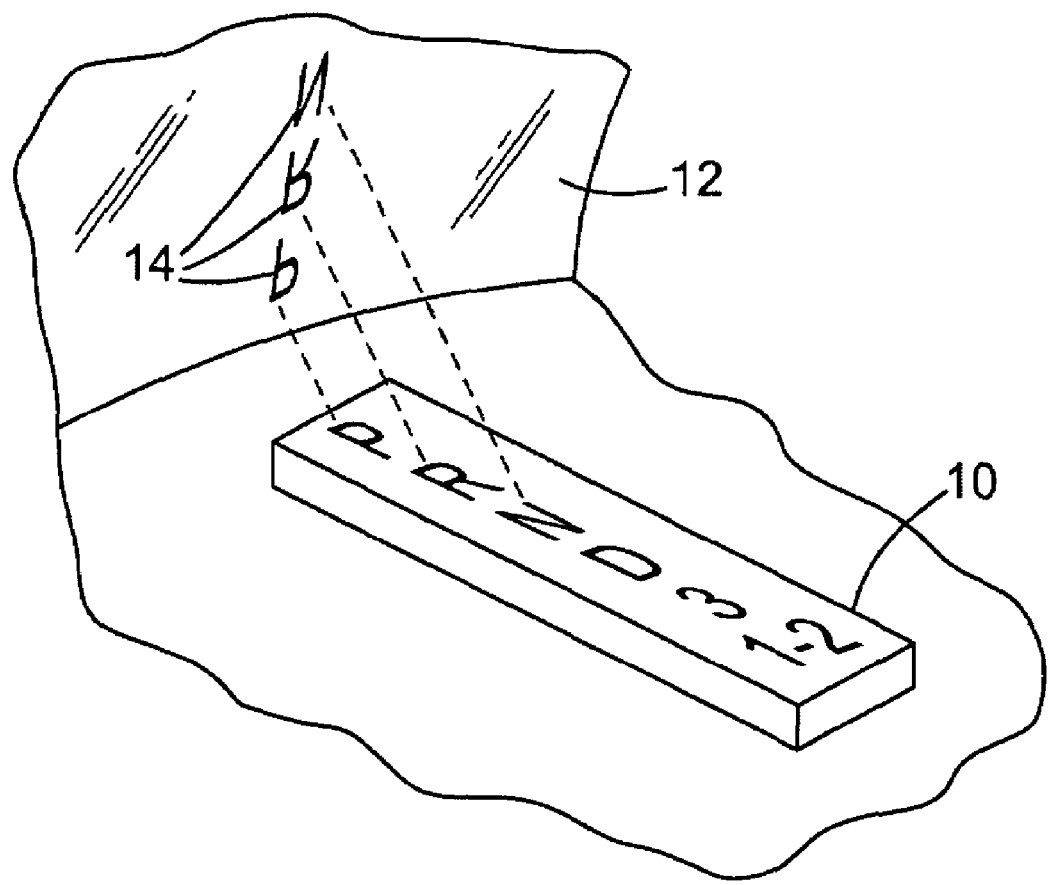
FIG. 1 shows a conventional backlit display and undesirable reflections associated therewith.

FIG. 1 shows a conventional backlit instrument panel 10. Instrument panel 10 is of the type typically associated with a console mounted selector for an automatic transmission in an automobile. The characters on instrument panel 10 are viewable during the day when ambient light such as sunlight is reflected from the surface of the instrument or control panel to the viewer's eye. The information on instrument panel 10 is may be formed in a variety of ways, including by printing with a non-diffusive ink or by cutting or laser ablating the characters from an injection molded layer. At night, viewing of the instrument panel 10 is facilitated by a backlight behind instrument panel 10. The backlight causes light to pass through the instrument panel 10 to produce an illuminated version of the image that is viewable during the day. While some of the light provides the desired result, some of the light from instrument panel 10 is scattered and strikes windshield 12. This creates reflections 14, which can be distracting to a driver or even create dangerous situations. While only instrument panel 10 is shown in FIG. 1, other backlit devices in the automobile, such as control panels, buttons, and switches may similarly cause reflections on windshield 12, further distracting the driver.

Figure 2:
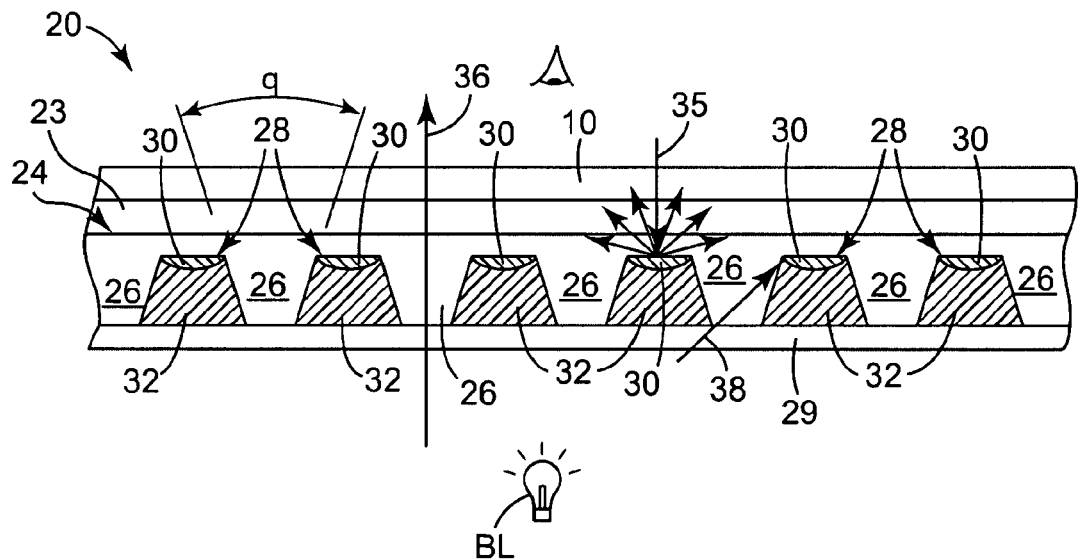
FIG. 2 shows an optical element according to an embodiment of the present invention.

FIG. 2 shows optical element 20 according to an embodiment of the present invention. Optical element 20 may optionally include carrier substrate 23 having carrier surface 24. Carrier surface 24 includes a plurality of light transmitting regions 26 formed thereon. Cavities 28 are defined by adjacent light transmitting regions 26. Light transmitting regions 26 may extend substantially uninterrupted across carrier surface 24 (along the dimension extending into the page) such that cavities 28 also extend substantially uninterrupted across carrier surface 24 to form channels or grooves. Alternatively, light transmitting regions 26 may be posts or flat topped pyramids or cones that are formed periodically on carrier surface 24 such that light transmitting regions 26 surround each cavity 28 and form pits or columns along carrier surface 24. In addition, diffuser foil 29 is optionally coupled to a back surface of optical element 20.

Each cavity 28 is occupied by diffusely reflecting material 30 and light absorbing material 32. Diffusely reflecting material 30 is distributed in cavities 28 such that diffusely reflecting material 30 occupies the portion of cavities 28 proximate to carrier substrate 23. Diffusely reflecting material 30 forms a substantially convex shape facing the back surface of optical element 20. In one embodiment, diffusely reflecting material 30 is a white enamel paint or ink. In another embodiment, diffusely reflecting material 30 is a $TiO_2$ powder mixed into a liquid, curable resin. Diffusely reflecting material 30 may also include a pigmented coating or a metallized coating, and may include diffusely reflecting additives such as calcium carbonate or metallic flakes. In an alterative embodiment, a reflecting material, such as a silver ink, is employed in cavities 28 instead of diffusely reflecting material 30.

The remainder of each cavity 28 is occupied by light absorbing material 32. Light absorbing material 32 fills cavities 28 such that light absorbing material 32 and light transmitting regions 26 define an optically smooth planar surface facing backlight BL. In the embodiment in FIG. 2, light absorbing material 32 covers the side walls of cavities 28. The area between the side walls is also occupied by light absorbing material 32. In one embodiment, light absorbing material 32 is a black enamel paint or ink. In another embodiment, light absorbing material 32 is a carbon black powder mixed into a liquid, curable resin. In an alternative embodiment, diffusely reflecting material 30 and light absorbing material 32 occupy opposite portions of cavities 28.

Optical element 20 is typically incorporated into an optical system including backlight BL, such as backlit instrument panel 10. Optical element 20 is incorporated into the optical system such that its back surface faces backlight BL and its front surface faces instrument panel 10. In one embodiment, carrier substrate 23 (if present) is laminated onto a backside of instrument panel 10 through chemical or mechanical bonding. A protective layer may also be laminated onto the front surface of optical element 20 before laminating optical element 20 onto instrument panel 10. The information provided on instrument panel 10 is viewable when there is sufficient ambient light, such as during the day when sunlight allows viewing of the information. Optical element 20 permits viewing of the information on instrument panel 10 when use of backlight BL is necessary, such as at night when ambient light is at a minimum. More importantly, the architecture of optical element 20 is such that, during a backlit condition, light is prevented from exiting optical element 20 at angles that cause reflections on windshield 12 and other reflective surfaces.

When ambient light conditions are sufficient, such as during the day or in an artificially lit area, light rays impinge on instrument panel 10. Some of the ambient light illuminates the surface of instrument panel 10. The pattern of the light reflected and absorbed by instrument panel 10 allows the information printed on instrument panel 10 to be viewed. In addition, some of the ambient light, such as light ray 35 shown in FIG. 2, passes through instrument panel 10 and impinges on diffusely reflecting material 30. When light ray 35 strikes diffusely reflecting material 30, it is diffusely scattered back toward the viewer through instrument panel 10. This causes the information on instrument panel 10 to stand out more in an ambient light condition due to the scattered light passing through instrument panel 10.

When ambient light conditions are insufficient, backlight BL is used to illuminate instrument panel 10. The pattern of the light transmitted through and absorbed by instrument panel 10 allows the information printed on instrument panel 10 to be viewed through light transmitting regions 26. Light ray 36 is shown in FIG. 2 to depict the light that is transmitted from backlight BL through instrument panel 10 to produce an image of the information printed on instrument panel 10. Diffuser foil 29, which is optionally coupled to the optically smooth surface formed by light transmitting regions 26 and light absorbing material 32, distributes the light from backlight BL more uniformly across instrument panel 10.

To prevent light emitted by backlight BL from producing reflections on windshield 12, optical element 20 prevents light from backlight BL from scattering from light transmitting regions 26 at undesirable angles. As shown by light ray 38, this occurs when light passes through light transmitting region 26 at an undesirable angle and is absorbed by light absorbing material 32. Included angle θ is a factor in establishing the light ray angles that will be absorbed by light absorbing material 32. In one embodiment, included angle θ is in the range of approximately 0° to 10°. Another factor that determines the light control character of optical element 20 is the extent to which light absorbing material 32 covers the side walls of cavities 28. That is, greater coverage of the side walls of cavities 28 by light absorbing material 32 results in less transmission of light from backlight BL at undesirable angles. Further factors that determine the light control character of optical element 20 are the width and depth of and the spacing between cavities 28. All of these factors are adjustable to produce the desired properties for a particular backlit optical system.

Optical film 20 may be formed using a variety of techniques. In one embodiment, a microreplication tool is first made including wells having the desired shape for light transmitting regions 26. A liquid, curable solution is then cast onto the microreplication tool such that the solution fills the wells. Carrier substrate 23 may subsequently be coupled to the microreplication tool such that carrier substrate 23 is distributed uniformly on the microreplication tool. In one embodiment, carrier substrate 23 is made of a transparent polymeric material, such as polyethylene terephthalate (PET). The structure is then cured according to the specifications of the liquid, curable solution to form light transmitting regions 26. During the curing process, light transmitting regions 26 cross-link with carrier substrate 23 to form a connected structure, which is then peeled from the microreplication tool. Diffusely reflecting material 30 is subsequently evenly cast over light transmitting regions 26 and into cavities 28. A squeegee or some other smoothing apparatus may be used to clear diffusely reflecting material 30 from the tops of light transmitting regions 26. After curing diffusely reflecting material 30, the same procedure may be used to liquid, curable light absorbing material 32 to fill the remaining portions of cavities 28.

Figure 3:
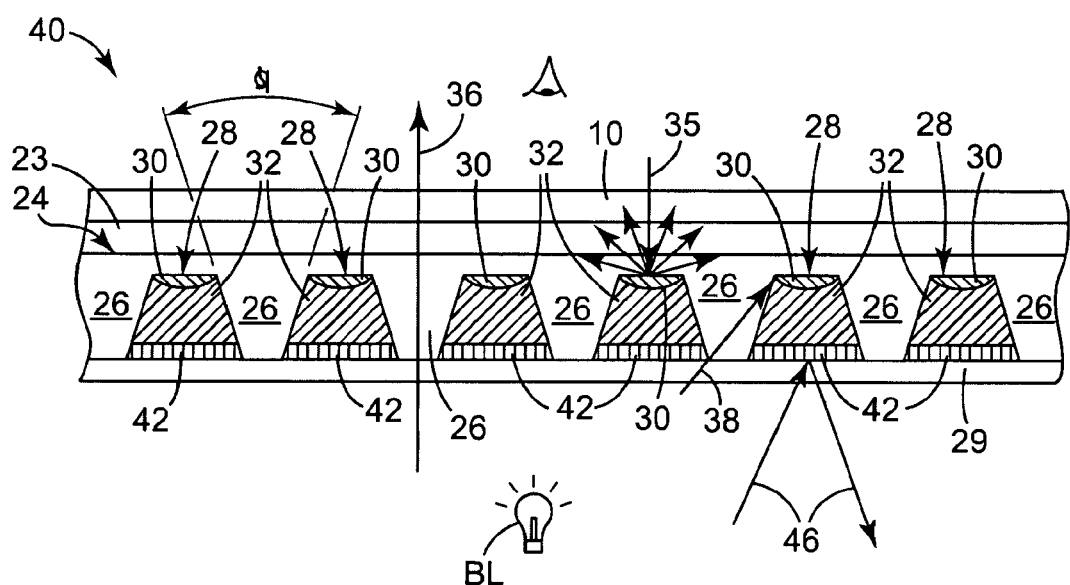
FIG. 3 shows an optical element according to another embodiment of the present invention including a reflecting material facing the back side of the optical element.

FIG. 3 shows optical element 40 according to another embodiment of the present invention including reflecting material 42 facing the back surface of optical element 40. Optical element 40 also includes many similar components as optical element 20 shown in FIG. 2, including optional carrier substrate 23, light transmitting regions 26, and optional diffuser foil 29. Optical element 40 is incorporated into a backlit optical system, such as instrument panel 10, such that its back surface faces backlight BL and its front surface faces instrument panel 10. In one embodiment, carrier substrate 23 (if present) is laminated onto a backside of instrument panel 10.

A protective layer may also be laminated onto the front surface of optical element 20 before laminating optical element 20 onto instrument panel 10.

Each cavity 28 in optical element 40 is occupied by diffusely reflecting material 30, light absorbing material 32, and reflecting material 42. Diffusely reflecting material 30 and light absorbing material 32 are successively distributed into cavities 28 as in the embodiment shown in FIG. 2. Reflecting material 42 (having a reflectivity of greater than about 50%) is then distributed in cavities 28 such that reflecting material 42 fills the portion of each cavity 28 nearest the back surface of optical element 40. In one embodiment, reflecting material 42 is a silver enamel paint or ink. In another embodiment, reflecting material 42 is a reflective metal such as silver. In a further embodiment, reflecting material 42 is a multilayer configuration including layers of reflecting material having different refractive indices. In an alternative embodiment, a diffusely reflecting material is substituted for reflecting material 42.

Similar to optical element 20, when ambient light conditions are sufficient, some of the light rays illuminate the surface of instrument panel 10 such that the pattern of the light reflected and absorbed by instrument panel 10 allows the information printed on instrument panel 10 to be viewed. Also, some of the ambient light (e.g., light ray 35) passes through instrument panel 10 and impinges on diffusely reflecting material 30 along the front surface of optical element 20. When light ray 35 strikes diffusely reflecting material 30, it is diffusely scattered back toward the viewer through instrument panel 10. This improves the viewability of the information on instrument panel 10 in an ambient light condition due to the scattered light passing through instrument panel 10.

When ambient light conditions are insufficient, light (e.g., light ray 36) is transmitted from backlight BL through instrument panel 10 to produce an image of the information printed on instrument panel 10. Diffuser foil 29, which is optionally coupled to the optically smooth surface formed by light transmitting regions 26 and reflecting material 42, distributes the light from backlight BL more uniformly across instrument panel 10. To prevent light emitted by backlight BL from producing reflections on windshield 12, light absorbing material 32 absorbs light (e.g., light ray 38) that passes through light transmitting regions 26 at an undesirable angle.

To increase the efficiency of the optical system, reflecting material 42 may be provided in cavities 28 facing backlight BL. When light from backlight BL impinges on reflecting material 42 (e.g., light ray 46), it is reflected back toward backlight BL. A portion of this reflected light may then be recycled by backlight BL by redirecting the reflected light back toward optical element 40 at an angle that allows it to pass through one of light transmitting regions 26. As a result, light from backlight BL that may have been absorbed by light absorbing material 32 or been otherwise unused is returned to optical element 40 for transmission to the viewer through instrument panel 10.

Figure 4:
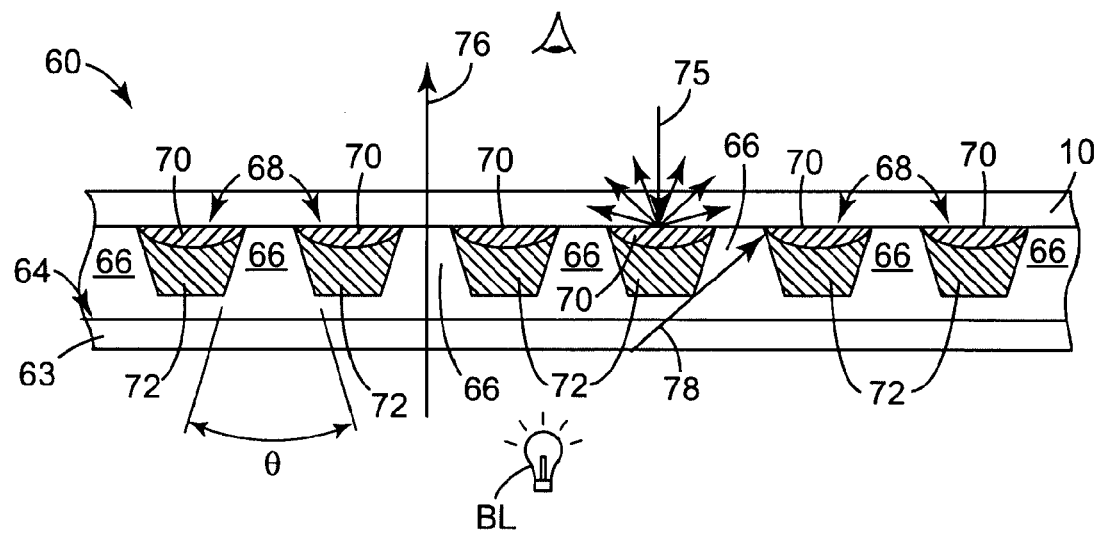
FIG. 4 shows an optical element according to another embodiment of the present invention including light controlling cavities that widen from the backlight side to the viewing side of the optical element.

FIG. 4 shows an optical element 60 according to another embodiment of the present invention. Optical element 60 may optionally include carrier substrate 63 having carrier surface 64. Carrier surface 64 includes a plurality of light transmitting regions 66 formed thereon. Cavities 68 are defined by adjacent light transmitting regions 66. Light transmitting regions 66 may extend substantially uninterrupted across carrier surface 64 (along the dimension extending into the page) such that cavities 68 also extend substantially uninterrupted across carrier surface 64 to form channels or grooves. Alternatively, light transmitting regions 66 may be posts or upside-down flat topped pyramids or cones that are formed periodically on carrier surface 64 such that light transmitting regions 66 surround each cavity 68 and form pits or columns along carrier surface 64. Optical element 60 is incorporated into a backlit optical system, such as instrument panel 10, such that its back surface faces backlight BL and its front surface faces instrument panel 10. In one embodiment, carrier substrate 63 (if present) is laminated onto a backside of instrument panel 10 through chemical or mechanical bonding. A protective layer may also be laminated onto the front surface of optical element 60 before laminating optical element 60 onto instrument panel 10.

Each cavity 68 is occupied by diffusely reflecting material 70 and light absorbing material 72. Light absorbing material 72 is first provided in cavities 68 such that light absorbing material 72 wets the side walls of cavities 68 and forms a concave meniscus proximate to the front surface of optical element 60. The area between the side walls is also occupied by light absorbing material 72. In one embodiment, light absorbing material 72 is a black enamel paint or ink. In another embodiment, light absorbing material 72 is a carbon black powder mixed into a liquid, curable resin.

The remainder of each cavity 68 is occupied by diffusely reflecting material 70. Diffusely reflecting material 70 is distributed in cavities 68 such that diffusely reflecting material 70 and light transmitting regions 66 define an optically smooth planar front surface. In other words, diffusely reflecting material 70 fills the area above the concave meniscus formed by light absorbing material 72. In one embodiment, diffusely reflecting material 70 is a white enamel paint or ink. In another embodiment, diffusely reflecting material 70 is a $TiO_2$ powder mixed into a liquid, curable resin. Diffusely reflecting material 70 may also include a pigmented coating or a metallized coating, and may include diffusely reflecting additives such as calcium carbonate or metallic flakes. In an alternative embodiment, diffusely reflecting material 70 and light absorbing material 72 occupy opposite portions of cavities 68. In another alterative embodiment, a reflecting material, such as a silver ink, is employed in cavities 68 instead of diffusely reflecting material 70.

Structurally, optical element 60 differs from optical elements 20, 40 (FIGS. 2 and 3) in that cavities 68 are wider at the front surface of optical element 60 than at the back surface of optical element 60. That is, light transmitting regions 66 narrow from the side facing the, back surface to the front surface. However, the operation of optical element 60 is similar to the operation of optical element 20. That is, the pattern of the light reflected and absorbed by instrument panel 10 allows the information printed on instrument panel 10 to be viewed. In addition, ambient light (e.g., light ray 75) that passes through instrument panel 10 is diffusely scattered by diffusely reflecting material 70 back toward instrument panel 10. When backlight BL is used to illuminate instrument panel 10, light (e.g., light ray 76) is transmitted from backlight BL through optical element 70 to instrument panel 10 to produce an image of the information printed on instrument panel 10. To prevent light emitted by backlight BL from producing reflections on windshield 12, light absorbing material 72 absorbs light (e.g., light ray 78) that passes through light transmitting regions 66 at an undesirable angle. A layer of reflecting material (not shown) may also be added to the bottom of cavities 68 to reflect and reuse some of light from backlight BL, similar to the embodiment shown in FIG. 3. In addition, a diffuser foil (not shown) may be optionally coupled to the back surface of optical element 60 to distribute the light from backlight BL more uniformly across instrument panel 10.

Figure 5:
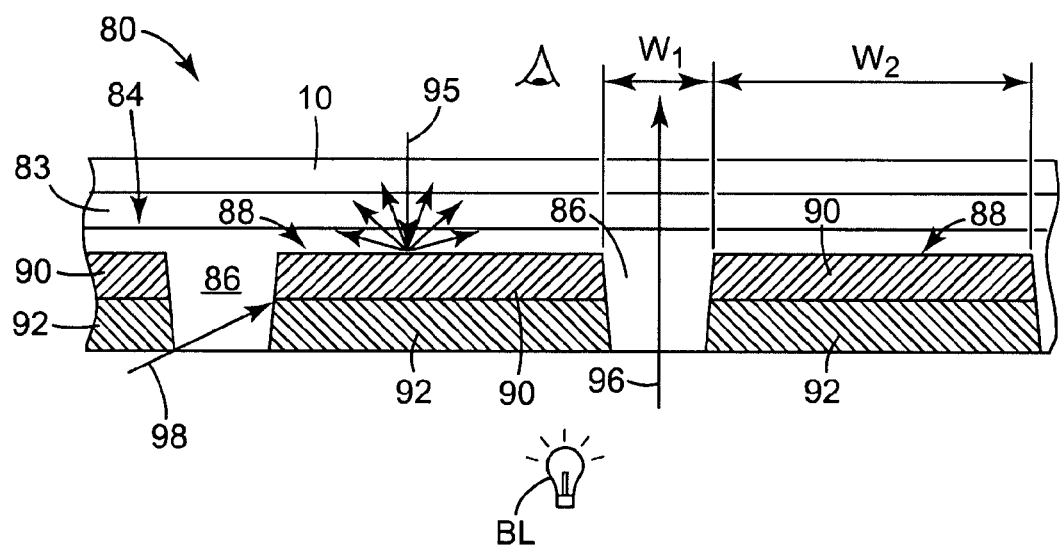
FIG. 5 shows an optical element according to another embodiment of the present invention including wide light controlling cavities.

FIG. 5 shows optical element 80 according to another embodiment of the present invention. Optical element 80 may optionally include carrier substrate 83 having carrier surface 84. Carrier surface 84 includes a plurality of light transmitting regions 86 formed thereon. Cavities 88 are defined by adjacent light transmitting regions 86. Light transmitting regions 86 may extend substantially uninterrupted across carrier surface 84 (along the dimension extending into the page) such that cavities 88 also extend substantially uninterrupted across carrier surface 84 to form channels or grooves. Alternatively, light transmitting regions 86 may be posts or flat topped pyramids or cones that are formed periodically on carrier surface 84 such that light transmitting regions 86 surround each cavity 88 and form pits or columns along carrier surface 84. Optical element 80 is incorporated into a backlit optical system, such as instrument panel 10, such that its back surface faces backlight BL and its front surface faces instrument panel 10. In one embodiment, carrier substrate 83 (if present) is laminated onto a backside of instrument panel 10 through chemical or mechanical bonding.

Each cavity 88 is occupied by diffusely reflecting material 90 and light absorbing material 92. Diffusely reflecting material 90 is distributed in cavities 88 such that diffusely reflecting material 90 occupies the portion of cavities 88 proximate to carrier substrate 83. Diffusely reflecting material 90 covers portions of the side walls of cavities 88 and the bottom of cavities 88 along carrier surface 84 such that diffusely reflecting material 90 fills approximately half of cavities 88. In one embodiment, diffusely reflecting material 90 is a white enamel paint or ink. In another embodiment, diffusely reflecting material 90 is a $TiO_2$ powder mixed into a liquid, curable resin. Diffusely reflecting material 90 may also include a pigmented coating or a metallized coating, and may include diffusely reflecting additives such as calcium carbonate or metallic flakes. In an alterative embodiment, a reflecting material, such as a silver ink, is employed in cavities 88 instead of diffusely reflecting material 90.

The remainder of each cavity 88 is occupied by light absorbing material 92. Light absorbing material 92 fills cavities 88 such that light absorbing material 92 and light transmitting regions 86 define an optically smooth planar surface facing backlight BL. In the embodiment shown in FIG. 5, light absorbing material 92 fills approximately half of cavities 88. Alternatively, diffusely reflecting material 90 and light absorbing material 92 can fill cavities 88 such that light absorbing material 92 covers most of the side walls of cavities 88 (similar to the embodiments shown in FIGS. 2 and 3). In one embodiment, light absorbing material 92 is a black enamel paint or ink. In another embodiment, light absorbing material 92 is a carbon black powder mixed into a liquid, curable resin. In an alternative embodiment, diffusely reflecting material 90 and light absorbing material 92 occupy opposite portions of cavities 88.

The operation of optical element 80 is similar to the operation of optical element 20. That is, the pattern of the light reflected and absorbed by instrument panel 10 allows the information printed on instrument panel 10 to be viewed. In addition, ambient light (e.g., light ray 95) that passes through instrument panel 10 is diffusely scattered by diffusely reflecting material 90 back toward instrument panel 10. When backlight BL is used to illuminate instrument panel 10, light (e.g., light ray 96) is transmitted from backlight BL through optical element 90 to instrument panel 10 to produce an image of the information printed on instrument panel 10. To prevent light emitted by backlight BL from producing reflections on windshield 12, light absorbing material 92 absorbs light (e.g., light ray 98) that passes through light transmitting regions 86 at an undesirable angle. A layer of reflecting material (not shown) may also be added to the bottom of cavities 88 to reflect and reuse some of light from backlight BL, similar to the embodiment shown in FIG. 3. In addition, a diffuser foil (not shown) may be optionally coupled to the back surface of optical element 80 to distribute the light from backlight BL more uniformly across instrument panel 10.

Structurally, in this embodiment, optical element 80 differs from optical element 20 in that cavities 88 are wider than light transmitting regions 86. As shown in FIG. 5, light transmitting regions 86 have a width $w_1$ along the front surface of optical element 80, while cavities 88 have a width $w_2$ along the front surface of optical element 80. However, the ratio of width $w_2$ to width $w_1$ may be in the range of about 1:5 to 10:1, preferably in the range of about 1:1 to 6:1, and most preferably in the range of about 2:1 to 5:1. In one embodiment, the ratio of a width of the light reflecting layer at the front side to a width of the light transmitting regions at the front side is approximately 4 to 1. By making cavities 88 wider than light transmitting regions 86, more diffusely reflecting material 90 is exposed at the front surface of optical element 80. Consequently, more ambient light is diffusely scattered from the front surface toward instrument panel 10.

Figure 6:
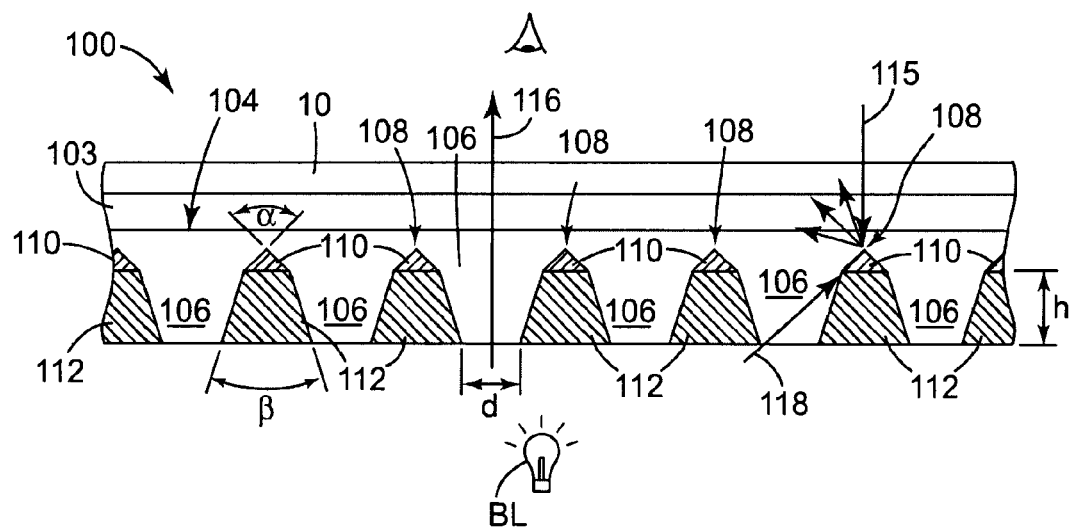
FIG. 6 shows an optical element according to a further embodiment of the present invention including multi-angled light controlling cavities.

FIG. 6 shows optical element 100 according to another embodiment of the present invention. Optical element 100 may optionally include carrier substrate 103 having carrier surface 104. Carrier surface 104 includes a plurality of light transmitting regions 106 formed thereon including two portions having different included angles α and β. Cavities 108 are defined by adjacent light transmitting regions 106, and are separated by distance d along a back surface of optical element 100. Light transmitting regions 106 may extend substantially uninterrupted across carrier surface 104 (along the dimension extending into the page) such that cavities 108 also extend substantially uninterrupted across carrier surface 104 to form channels or grooves. Alternatively, light transmitting regions 106 may be posts that are formed periodically on carrier surface 104 such that light transmitting regions 106 surround each cavity 108 and form pits or columns along carrier surface 104. Optical element 100 is incorporated into a backlit optical system, such as instrument panel 10, such that its back surface faces backlight BL and its front surface faces instrument panel 10. In one embodiment, carrier substrate 103 (if present) is laminated onto a backside of instrument panel 10 through chemical or mechanical bonding.

Each cavity 108 is occupied by diffusely reflecting material 110 and light absorbing material 112. Diffusely reflecting material 110 is distributed in cavities 108 such that diffusely reflecting material 110 occupies the portion of cavities 108 close to carrier substrate 103. In one embodiment, diffusely reflecting material 110 fills the portion of cavities 108 having included angle α. Alternatively, diffusely reflecting material 110 may fill a portion of cavities 108 that is not coincident with the transition location between included angle α and included angle β. In one embodiment, diffusely reflecting material 110 is a white enamel paint or ink. In another embodiment, diffusely reflecting material 110 is a $TiO_2$ powder mixed into a liquid, curable resin. Diffusely reflecting material 110 may also include a pigmented coating or a metallized coating, and may include diffusely reflecting additives such as calcium carbonate or metallic flakes. In an alterative embodiment, a reflecting material is employed in cavities 108 instead of diffusely reflecting material 110.

The remainder of each cavity 108 is occupied by light absorbing material 112. Light absorbing material 112 is distributed in cavities 108 such that light absorbing material 112 fills the remainder of cavities 108 and forms an optically smooth surface with light transmitting regions 106 facing backlight BL. In one embodiment, diffusely reflecting material 110 occupies the portion of cavities 108 having included angle β to height h. In one embodiment, light absorbing material 112 is a black enamel paint or ink. In another embodiment, light absorbing material 112 is a carbon black powder mixed into a liquid, curable resin. In an alternative embodiment, diffusely reflecting material 110 and light absorbing material 112 occupy opposite portions of cavities 108.

When ambient light conditions are sufficient, some of the ambient light illuminates the surface of instrument panel 10 for viewing the information on instrument panel 10, while some of the ambient light (e.g., light ray 115) impinges on diffusely reflecting material 110 and is diffusely scattered back toward the viewer through instrument panel 10. The scattered light causes the information on instrument panel 10 to stand out more in an ambient light condition due to the contrast between the information on instrument panel 10 and diffusely reflecting material 110.

When ambient light conditions are insufficient, light (e.g., light ray 116) is transmitted from backlight BL through optical element 100 to instrument panel 10 to produce an image of the information printed on instrument panel 10. To prevent light emitted by backlight BL from producing reflections on windshield 12, light absorbing material 112 absorbs light that passes through light transmitting regions 106 at an undesirable angle (e.g., light ray 118). The size and shape of light transmitting regions 106, the values of included angles α and β, height h of light absorbing material 112, and distance d between adjacent cavities 108 contribute to establishing the light ray angles that will be absorbed by light absorbing material 112. When these parameters are appropriately selected, light from backlight BL will not impinge on diffusely reflecting material 110 because it is shielded from backlight BL by light absorbing material 112. Consequently, light from backlight BL passes through light transmitting regions 106 without being scattered by diffusely reflecting material 110. This prevents "ghosting" (i.e., a faint, displaced replication) of the information on instrument panel 10 from being transmitted to the viewer. In one embodiment, included angle β is in the range of about 0° to about 10°, and included angle α is determined from the following equation.

$$\alpha = 180° - 2\arctan\left(\frac{h}{d + h\tan\frac{\beta}{2}}\right) \quad \text{(Equation 1)}$$

A layer of reflecting material (not shown) may also be added to cavities 108 to face the back surface of optical element 100 to reflect and reuse some of light from backlight BL, similar to the embodiment shown in FIG. 3. In addition, a diffuser foil (not shown) may be optionally coupled to the back surface of optical element 100 to distribute the light from backlight BL more uniformly across instrument panel 10.

Figure 7:
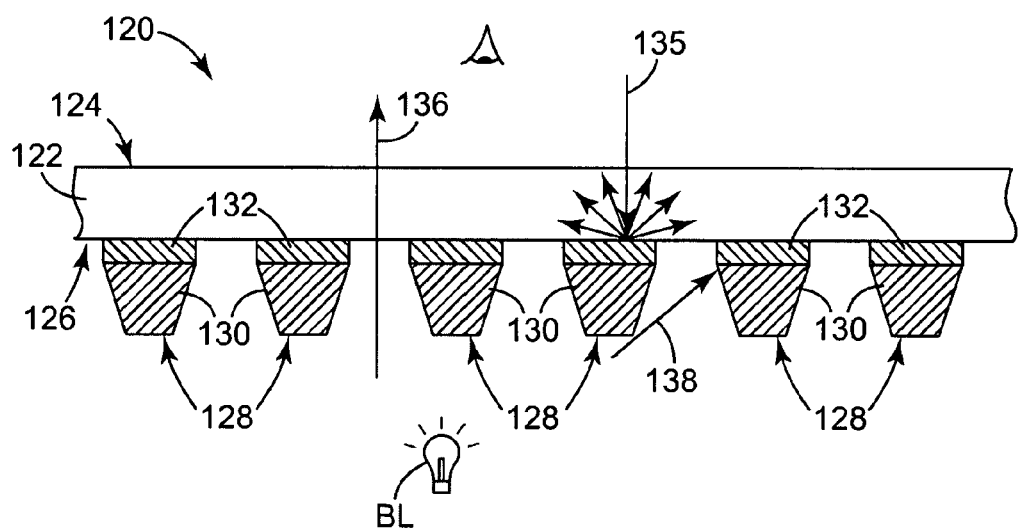
FIG. 7 shows an optical element according to a still further embodiment of the present invention including light controlling structures and a planar surface for printing.

FIG. 7 shows optical element 120 according to another embodiment of the present invention. Optical element 120 includes substrate 122 having a front surface 124 and a back surface 126. Back surface 126 includes a plurality of structures 128 formed thereon. Each structure 128 includes light absorbing portion 130 and diffusely reflecting portion 132. While the function of optical element 120 is substantially similar, optical element 120 differs from the embodiments heretofore described in that structures 128 formed on substrate 122 are themselves light controlling, and the spaces between structures 128 function as light transmitting regions. An advantage of the embodiment shown in FIG. 7 is that structures 128 are protected from the viewer by substrate 122 so that there is no risk of damage to structures 128. In addition, front surface 124 remains substantially planar to allow information to be provided directly thereon (e.g., printing with non-diffuse black ink).

In ambient light conditions, some of the ambient light passes between structures 128 to be reflected by backlight BL back through substrate 122 toward the viewer. In addition, some of the ambient light impinges on diffusely reflecting portions 132 and is diffusely scattered back toward the viewer (as depicted by light ray 135). The scattered ambient light permits viewing of the information printed on front surface 124. When ambient light conditions are insufficient, light (e.g., light ray 136) is transmitted from backlight BL through substrate 122 to produce an image of the information printed on front surface 124. To prevent light emitted by backlight BL from producing reflections on windshield 12, light absorbing portions 130 absorb light (e.g., light ray 138) that impinges on optical element 120 at undesirable angles.

In summary, a problem with lighted instruments and control panels in automobiles is that light is emitted from the instrument panels through a wide range of angles. Some of this light strikes glass surfaces such as the windshield and is reflected back to the driver. One approach to preventing these reflections is to use a light controlling film in the window covering the instrument panel. Conventional light controlling films suffer from various drawbacks, including failure to reflect ambient light (thus appearing black during the day), excessive thickness, and scattering of light through printed portions of the film. The present invention is an optical element having a front side and a back side for operation in an ambient lit mode and a backlit mode. A diffusely reflecting layer faces the front side for reflecting ambient light. A light absorbing layer faces the back side and is positioned to prevent back light from illuminating the diffusely reflecting layer. A plurality of light transmitting regions extend through the light absorbing layer and the diffusely reflecting layer for permitting back light to pass through in a restricted angular range without illuminating the diffusely reflecting layer.

Although the present invention has been described with reference to preferred embodiments, workers skilled in the art will recognize that changes may be made in form and detail without departing from the spirit and scope of the invention.

The invention claimed is:

1. An optical element having a front side and a back side for operation in an ambient lit mode and a backlit mode, the optical element comprising:
   a diffusely reflecting layer facing the front side for reflecting ambient light; a light absorbing layer between the diffusely reflecting layer and the back side and facing the back side positioned to prevent back light from illuminating the diffusely reflecting layer; and a reflecting layer between the light absorbing layer and the back side and facing the back side; and
   a plurality of light transmitting regions extending through the light absorbing layer and the diffusely reflecting layer for permitting back light to pass through in a restricted angular range without illuminating the diffusely reflecting layer.

2. The optical element of claim 1, wherein the diffusely reflecting layer comprises a resin combined with a white material.

3. The optical element of claim 1, wherein the light absorbing layer comprises a resin combined with a black material.

4. The optical element of claim 1, wherein the reflecting layer comprises a metal.

5. The optical element of claim 1, and further comprising:

a diffusion layer coupled to the back side of the optical element.

6. An optical element having a front side and a back side for operation in an ambient lit mode and a backlit mode, the optical element comprising:

an array of light transmitting regions for permitting back light to pass from the back side to the front side and emerge from the front side in a restricted angular range, the light transmitting regions located between channels having channel walls;

a light reflecting layer in each channel between the channels walls and facing the front side for reflecting ambient light; and a light absorbing layer in each channel between the channels walls and positioned with respect to the light reflecting layer to prevent back light from reaching the light reflecting layer; and a specular layer in each channel between the channels walls and facing the back side to redirect back light for retransmission through the light transmitting regions.

7. The optical element of claim 6, wherein the light transmitting regions are defined by channel walls extending through the optical element, and wherein the light absorbing layer substantially covers the channel walls.

8. The optical element of claim 6, wherein each of the light transmitting regions is defined by channels having channel walls which form an included angle with one another.

9. The optical element of claim 6, wherein the included angle is no greater than about 10°.

10. The optical element of claim 6, wherein the specular layer comprises a metal.

11. The optical element of claim 6, wherein a ratio of a width of the light reflecting layer at the front side to a width of the light transmitting regions at the front side is approximately 4 to 1.

12. An optical element comprising:

a light transmissive film having a plurality of cavities extending into a first surface thereof;

a light reflecting material which fills a first portion of each cavity for reflecting ambient light; and a light absorbing material which fills a second portion of each cavity for preventing back light from reaching the light reflecting layer; and a specularly reflecting material which fills a third portion of each cavity.

13. The optical element of claim 12, wherein the light reflecting material comprises a resin combined with a white material and the light absorbing material comprises a resin combined with a black material.

14. The optical element of claim 12, wherein the light reflecting material is diffuse.

15. The optical element of claim 12, wherein the light reflecting material is specular.

16. The optical element of claim 12, wherein the specularly reflecting material comprises a metal.

17. The optical element of claim 12, wherein the light transmissive film further includes a second surface opposite the first surface which is substantially planar and optically smooth.

18. The optical element of claim 17, and further comprising:

a diffusion layer coupled to the second surface.

19. A method for producing an optical element comprising:

forming a light transmissive film having a plurality of cavities extending into a first surface thereof;

in order, filling a first portion of each of the cavities with a light absorbing material; and filling a second portion of each of the cavities with a light reflecting material; and filling a third portion of each of the cavities with a specularly reflecting material.

20. The method of claim 19, wherein the light absorbing material comprises a resin combined with a black material and the light reflecting material comprises a resin combined with a white material.

* * * * *

UNITED STATES PATENT AND TRADEMARK OFFICE
CERTIFICATE OF CORRECTION

PATENT NO. : 7,419,272 B2  Page 1 of 1
APPLICATION NO. : 11/297615
DATED : September 2, 2008
INVENTOR(S) : Kay-Uwe Schenke It is certified that error appears in the above-identified patent and that said Letters Patent is hereby corrected as shown below:

Drawings
In the drawings, Sheet 2, Fig. 3, Delete " q " and insert -- q --, therefor.

Column 5
Line 48, Delete "matcrial" and insert -- material --, therefor.
Line 50, Delete "recycled" and insert -- "recycled" --, therefor.

Column 6
Line 45, Delete "the," and insert -- the --, therefor.

Column 8
Line 12, Delete "clement" and insert -- element --, therefor.

Signed and Sealed this

Second Day of December, 2008

JON W. DUDAS
*Director of the United States Patent and Trademark Office*